United States Patent [19]

Kaelin

[11] 4,322,377
[45] Mar. 30, 1982

[54] SURFACE AERATING ROTOR

[76] Inventor: Joseph R. Kaelin, Beckenriedstr. 58, CH-6374 Buochs, Switzerland

[21] Appl. No.: 213,059

[22] Filed: Dec. 4, 1980

Related U.S. Application Data

[63] Continuation of Ser. No. 46,675, Jun. 8, 1979, abandoned.

[30] Foreign Application Priority Data

Jun. 12, 1978 [CH] Switzerland .................... 6372/78

[51] Int. Cl.³ ................................................ B01F 3/04
[52] U.S. Cl. ............................ 261/91; 261/DIG. 75; 416/186 A; 416/224; 416/208
[58] Field of Search ................... 261/91, DIG. 75; 415/DIG. 2; 416/224, 186 A, 207, 208, 175, 203

[56] References Cited

U.S. PATENT DOCUMENTS

| | | | |
|---|---|---|---|
| 721,036 | 2/1902 | Gwynne et al. | 261/DIG. 75 |
| 1,471,141 | 10/1923 | Capell | 416/175 |
| 2,072,944 | 3/1937 | Durdin | 210/197 |
| 2,253,406 | 8/1941 | Wagner | 416/186 A |
| 2,351,516 | 6/1944 | Jandasek | 416/186 A |
| 2,589,558 | 3/1952 | Lamureaux | 416/175 |
| 2,620,039 | 12/1952 | Allen | 416/207 |
| 3,241,820 | 3/1966 | Clough | 261/91 |
| 3,341,450 | 9/1967 | Ciabattari et al. | 261/91 |
| 3,513,326 | 5/1970 | Potts | 416/175 A |
| 3,591,149 | 7/1971 | Auler | 261/91 |
| 3,637,196 | 1/1972 | Kaelin | 261/91 |
| 3,648,989 | 3/1972 | Friehe | 261/91 |
| 3,794,303 | 2/1974 | Hirshon | 261/DIG. 75 |
| 4,066,383 | 1/1978 | Lakin | 261/91 |
| 4,139,330 | 2/1979 | Neal | 416/207 |

FOREIGN PATENT DOCUMENTS

| | | | |
|---|---|---|---|
| 667735 | 7/1963 | Canada | 261/91 |
| 337179 | 6/1921 | Fed. Rep. of Germany | 416/186 A |
| 46-32231 | 9/1971 | Japan | 261/91 |
| 502838 | 3/1971 | Switzerland | 261/91 |
| 185139 | 8/1922 | United Kingdom | 416/186 A |

OTHER PUBLICATIONS

Gasoline Alley, The Washington Post, Sep. 7, 1930.

Primary Examiner—Tim R. Miles
Attorney, Agent, or Firm—Ernest F. Marmorek

[57] ABSTRACT

A surface aerating rotor has an intake zone for circulating and aerating a liquid, and includes a supporting assembly, a driving shaft connected to the supporting assembly, fixed flow guidance devices disposed in the intake zone of the rotor, and a plurality of fluid throughput units. Each fluid throughput unit has a discharge opening, and includes a vane which has an adjustable discharge angle with respect to the radial direction, and at least one flow guide wall. At least some of the fluid throughput units include an extension member downstream of the discharge opening, a flow guide profile on the extension member, and a baffle downstream of the flow guide profile. Connecting pins join the fluid throughput units to the supporting assembly, for adjustment of the vane discharge angle within a predetermined range.

12 Claims, 6 Drawing Figures

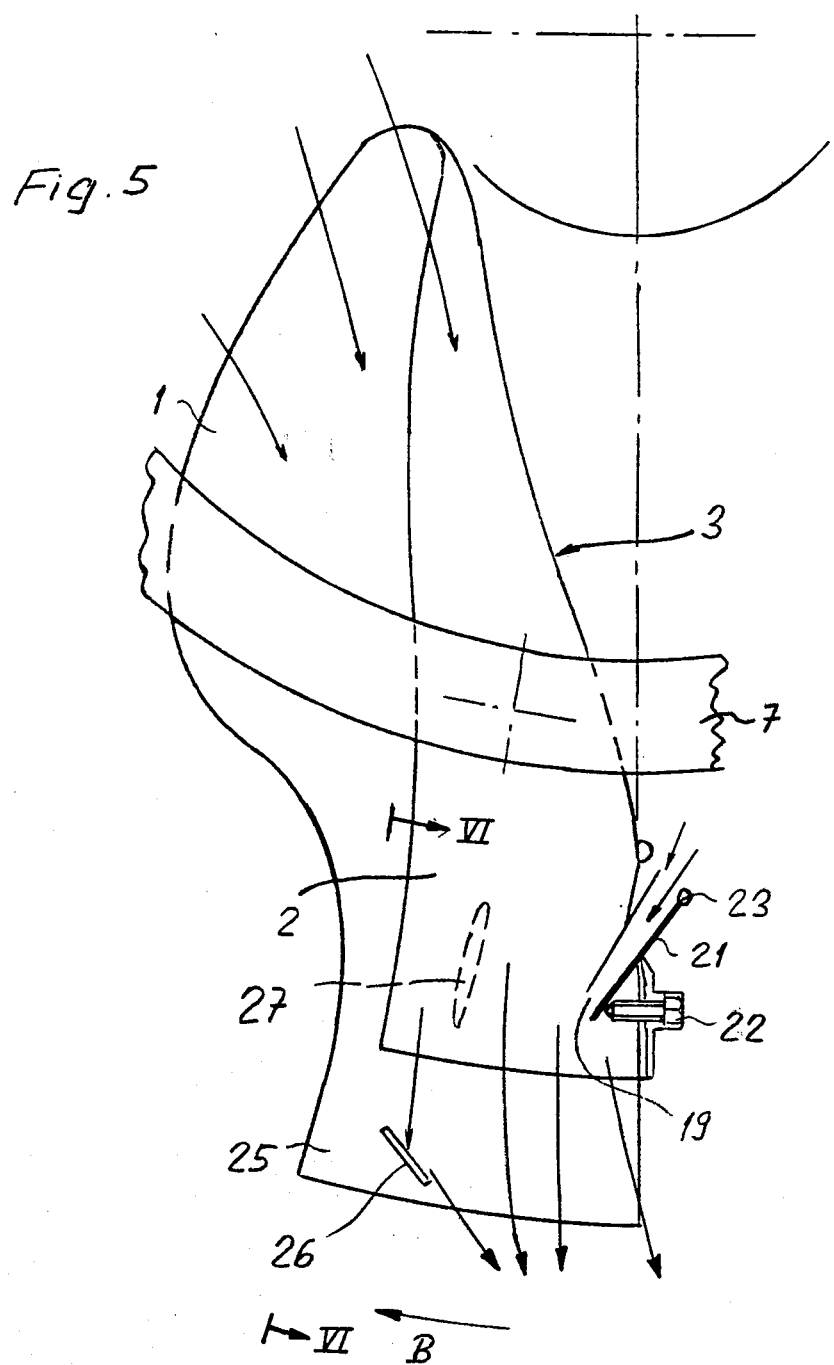

SURFACE AERATING ROTOR

This is a continuation of application Ser. No. 46,675, filed on June 8, 1979 now abandoned.

DESCRIPTION

The invention concerns a surface aerating rotor for the circulating and aerating of water, in particular of sewage in sewage treatment plants, comprising a supporting assembly connected to a vertical driving shaft.

Known rotor designs have the disadvantage that they involve making differently formed rotors for different speeds and/or throughputs, so that the need for different rotor components rules out economical production.

The object of the present invention is to provide a surface aerating rotor which, assembled from standard components, can be manufactured to a whole variety of operating characteristics.

The surface aerating rotor according to the invention is characterized in that each vane, in conjunction which is at least one flow guide wall, forms a fluid throughput unit whose entry side in operation is located below the water surface and whose exit side in opeation is located at least in greater part above the water surface; and that each fluid throughput unit is detachably connected to the supporting assembly, and the connecting point between each fluid throughput unit and the supporting assembly is designed in a manner permitting the vane exit angle to be adjusted within a certain range.

Thus, despite the use of completely identical components, it is possible by suitably fitting the various fluid throughput units to the supporting assembly to assemble rotors having different vane exit angles, i.e. having different operating characteristics.

To increase yet further the flexibililty of this unit construction system, it is expedient to arrange, between each fluid throughput unit and the supporting assembly, suitable means permitting the throw height of each fluid throughput unit to be individually adjusted. Such means may consist of a wedgeshaped intermediate piece, for instance.

It is advantageous to give the fluid throughput units on their exit side an L-, U- or H-shaped profile as viewed in the direction of rotor rotation.

For easy adjustability of the vane exit angle, it is advantageous to provide an arrangement wherein the supporting assembly comprises two mutually concentric horizontal supporting rings which are adjustable relatively to each other through an angle of rotation, and wherein each fluid throughput unit presents two vertically arranged connecting pins, whereof one is connected to the one supporting ring, the other to the other supporting ring. In this arrangement, it is expedient to have lockable adjusting means arranged between the two supporting rings.

The invention is now to be illustrated by way of example with reference to the drawing, in which FIG. 1 is a vertical section along the line I-I in FIG. 2 through an embodiment of a surface aerating rotor according to the invention but with element 12 shifted 30° clockwise from the position shown in FIG. 2, and element 13 removed for clarity;

FIG. 5 is a partly sectional top view of another embodiment of a fluid throughput unit.

Figure 1:
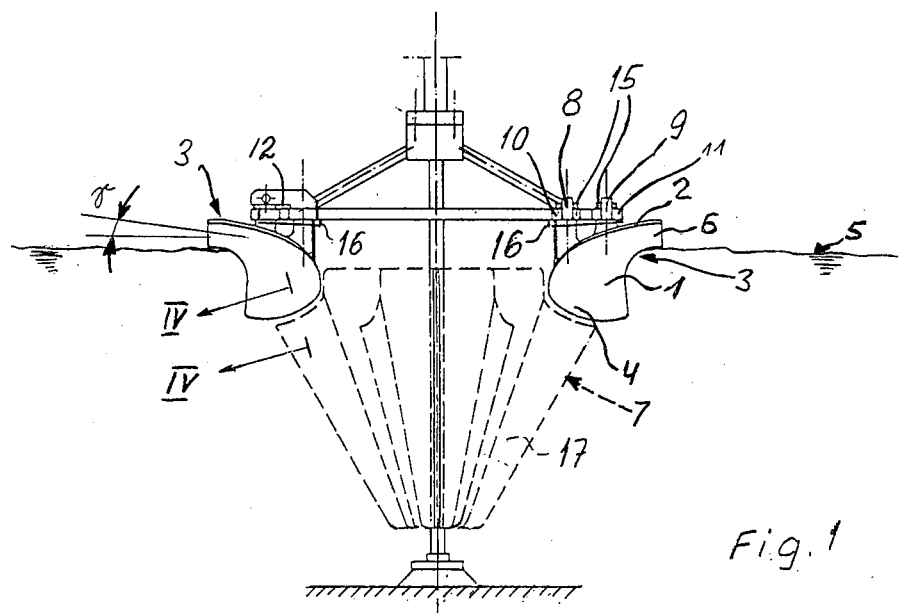

As may be seen from the drawing, in the rotor shown each of the vanes 1 forms, in conjunction with at least one flow guide wall 2, a fluid throughput unit 3 whose entry side 4 in operation is located below the water surface 5, and whose exit side 6 in operation is located above the water surface 5.

Each fluid throughout unit 3 is detachably connected to the supporting assembly 7 by two connecting pins 8,9. The supporting assembly 7 presents two mutually concentric horizontal supporting rings 10,11 which are adjustable relatively to each other through an angle of rotation $\beta$ and which are so adjustable by two lockable adjusting means 12,13 so that it is possible by suitable relative adjustment of the supporting rings 10,11 to use the same components to construct rotors having different vane exit angles $\alpha$.

Figure 2:
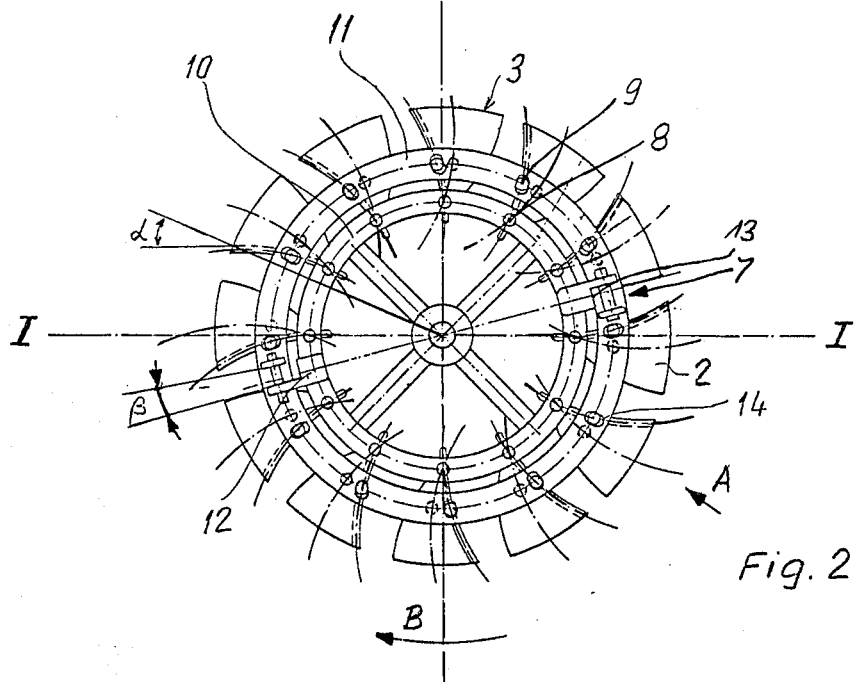
FIG. 2 is a plan view, as seen from above, of the embodiment shown in FIG. 1.

As shown in FIG. 2, the outer (viewed radially) connecting pin 9 in the outer supporting ring 11 extends through a slotted hole 14 for the purpose of adjustability.

Once the vane exit angle $\alpha$ required is set by the adjusting means 12,13, the individual fluid throughput units 3 can be locked in position by the nuts 15 arranged on the connecting pins 8,9.

When a rotor of another throw angle $\gamma$ is to be made, it is sufficient quite simply to arrange other wedge elements 16 between the individual fluid throughput units 3 and the supporting rings 10,11.

Arranged in the intake zone of the rotor is a fixed flow guidance device 17, as shown in FIG. 1.

As may be seen from the foregoing, it is possible with the same principal components to construct surface aerating rotors of widely differing characteristics, making it possible to manufacture these components by very efficient and economical batch production and closely adapt the rotor to any given conditions.

Figure 3:
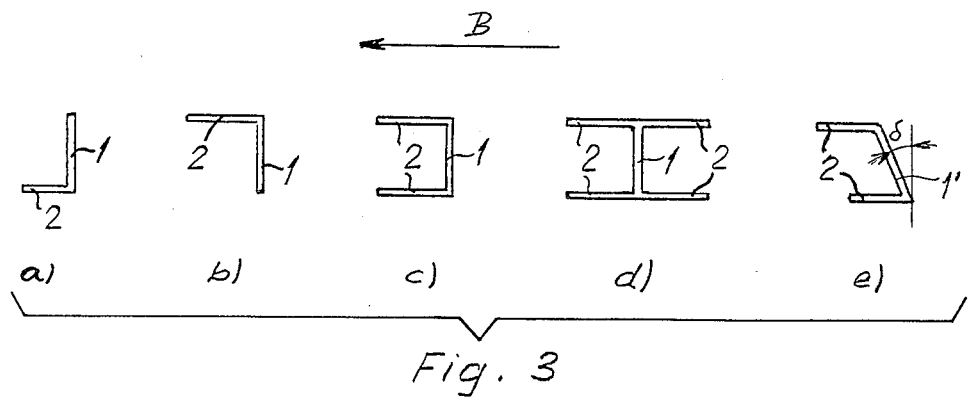
FIG. 3a to 3e are various profile forms of the exit side of the fluid throughput units as viewed in the direction of arrow A in FIG. 2.

FIG. 3 shows five different embodiments of exit profiles of the fluid throughput units 3, viewed in the direction of arrow A in FIG. 2, with arrow B indicating the direction of rotor rotation.

The H-shaped profile is intended for a rotor that can be run in both directions of rotation.

The form shown in FIG. 3e is designed to give a more efficient utilization of the cross-sectional profile with water at certain speeds. In this version, the vane web 1' slopes forward at an angle $\delta$ ranging from 5 to 40 degrees, depending on the operating speed.

Figure 4:
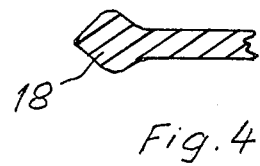
FIG. 4 is a section along the line IV—IV in FIG. 1.

To prevent as far as possible unwanted floating matter from fouling the vane entry edge 18, it has been found expedient to give the edge 18 a thickening as shown in FIG. 4. Floating matter fouling the vane entry edge thus enters zones of increased flow velocity and turbulence and is therefore detached from the edge and swept away.

Figure 6:
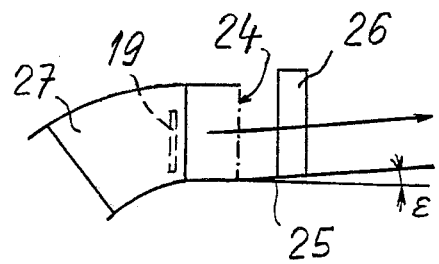
FIG. 6 is a section along the line VI—VI in FIG. 5.

To ensure that the liquid picks up oxygen-bearing air already when passing through the fluid throughput units 3, the latter are each provided, as may be seen in FIGS. 5 and 6, with an air admission aperture 19 which in rotor operation is located above the water surface 5 and which passes into a negative-pressure zone of the flow channel 20 formed in the unit 3. The size of the aperture 19 and the degree of flow deflection caused by the pivotable plate 21, i.e. the degree of enrichment with oxygen, can be regulated by the plate 21, which is adjustable by screw 22. The plate 21 is arranged to pivot about the axis 23.

To properly distribute the oxygen-enriched liquid leaving the fluid throughput units 3, it is possible, as may be seen from FIGS. 5 and 6, to arrange beyond the exit 24 a vertical baffle 26 immovably connected to the fluid throughput unit 3 by an extension member 25, the arrangement being such that the water impinging on the baffle 26 redirects the flow of the liquid in a predetermined direction.

It is in many cases advantageous to arrange the extension member 25 so as to rise radially outwards at an angle ε of preferably between 2 and 10 degrees.

Moreover, to obtain a controlled split of the flow inside the fluid throughput unit 3, the arrangement further comprises a flow guide profile 27 which extends in the throughput direction and which directs the one part-flow exactly towards the baffle 26.

As the surface aerating rotor according to the invention is very flexible and adaptable in construction, it can be used with fully satisfactory results for any of the widely differing tank forms and dimensions occurring in practice.

What is claimed is:

1. A surface aerating rotor having an intake zone for circulating and aerating a liquid, comprising in combination:
   a supporting assembly,
   a driving shaft connected to said supporting assembly,
   fixed flow guidance means disposed in the intake zone of said rotor,
   a plurality of fluid throughput means, receiving a major portion of the fluid through said fixed flow guidance means, each fluid throughput means having a discharge opening and including a vane having an adjustable discharge angle, with respect to the radial direction, and at least one flow guide wall,
   at least some of said fluid throughput means including an extension member disposed downstream of said discharge opening,
   flow guide means located on said extension member and extending substantially in the direction of flow of said liquid, and
   a baffle downstream of said flow guide means, for redirecting the flow of the liquid in a predetermined direction, at least part of the flow of the liquid passing through said flow guide means being diverted therefrom to said baffle, and
   connecting means, joining said fluid throughput means to said supporting assembly, and arranged for adjustment of said vane discharge angle within a predetermined range.

2. A surface aerating rotor as claimed in claim 1, wherein each fluid throughput means discharges a stream of fluid substantially forming a predetermined angle with the horizontal, and further comprising angle adjusting means disposed between said supporting assembly and said fluid throughput means for adjusting said predetermined angle.

3. A surface aerating rotor as claimed in claim 1, wherein each fluid throughput means has a discharge opening, and wherein its cross-section near said discharge opening is U-shaped.

4. A surface aerating rotor as claimed in claim 1, wherein each fluid throughput means has a discharge opening, and wherein its cross-section near said discharge opening is H-shaped.

5. A surface aerating rotor as claimed in claim 1, wherein said connecting means includes first and second connecting pins connected to said first and second rings.

6. A surface aerating rotor as claimed in claim 1, wherein each fluid throughput means has a discharge opening, and wherein its cross-section near said discharge opening is substantially U-shaped with the center portion inclined at a predetermined angle from the horizontal.

7. A surface aerating rotor as claimed in claim 1, wherein the liquid passing through each fluid throughput means includes a negative pressure zone, and wherein at least some of said fluid throughput means have respective apertures operatively disposed in said negative pressure zone for supplying an at least partially oxygen-bearing gas through a corresponding of said apertures to said liquid.

8. A surface aerating rotor as claimed in claim 7, wherein each of said fluid throughput means includes control means controlling the dimensions of said aperture.

9. A surface aerating rotor as claimed in claim 8, wherein said control means includes a deflection plate.

10. A surface aerating rotor as claimed in claim 1, wherein each vane is formed with a fluid-entry edge portion thicker than the remaining vane portion.

11. A surface aerating rotor as claimed in claim 1, wherein each fluid throughput means has a discharge opening, and wherein its cross-section near said discharge opening has an innermost portion inclined to the axis of rotation of said rotor from about 5 degrees to about 40 degrees.

12. A surface aerating rotor having an intake zone and an outlet zone for circulating and aerating a liquid, comprising in combination:
   a supporting assembly,
   a driving shaft connected to said supporting assembly,
   a plurality of fluid throughput means, each fluid throughput means having a discharge opening and including a vane extending substantially vertically in the range of the inlet zone, and radially outwards substantially along a horizontal direction in the range of the outlet zone, said vane being positionable at an adjustable discharge angle with respect to the radial direction, and at least one flow guide wall,
   at least some of said fluid throughput means including an extension member disposed downstream of said discharge opening,
   flow guide means located on said extension member and extending substantially in the direction of flow of said liquid, and
   a baffle downstream of said flow guide means, for redirecting the flow of the liquid in a predetermined direction, at least part of the flow of the liquid passing through said flow guide means being diverted therefrom to said baffle, and
   connecting means, joining said fluid throughput means to said supporting assembly, and arranged for adjustment of said vane discharge angle within a predetermined range.

* * * * *